US012660752B2

(12) United States Patent (10) Patent No.: US 12,660,752 B2
Simoneaux et al. (45) Date of Patent: Jun. 23, 2026

(54) SPEED CONTROL FOR HARVESTER

(71) Applicant: DEERE & COMPANY, Moline, IL (US)

(72) Inventors: Jeffrey J. Simoneaux, Gonzales, LA (US); Jason C. Buss, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 408 days.

(21) Appl. No.: 18/333,925

(22) Filed: Jun. 13, 2023

(65) Prior Publication Data

US 2024/0090380 A1 Mar. 21, 2024

Related U.S. Application Data

(60) Provisional application No. 63/407,000, filed on Sep. 15, 2022.

(51) Int. Cl.
*A01D 45/10* (2006.01)
*A01D 33/08* (2006.01)
*A01D 41/127* (2006.01)
(52) U.S. Cl.
CPC ............. *A01D 45/10* (2013.01); *A01D 33/08* (2013.01); *A01D 41/127* (2013.01)
(58) Field of Classification Search
CPC ...................................................... A01D 33/08
See application file for complete search history.

(56) References Cited

U.S. PATENT DOCUMENTS

| 623,109 | A | 4/1899 | Schuman |
|---|---|---|---|
| 1,031,472 | A | 7/1912 | Schubert |
| 2,092,134 | A | 9/1937 | Oppenheim |
| 4,270,337 | A | 6/1981 | Pinto |
| 4,295,325 | A | 10/1981 | Cannavan |
| 4,555,896 | A | 12/1985 | Stiff et al. |
| 5,031,392 | A | 7/1991 | Baker |
| 5,092,110 | A | 3/1992 | Dommert et al. |
| 5,129,219 | A | 7/1992 | Baker |
| 5,488,820 | A | 2/1996 | Cannavan |

(Continued)

FOREIGN PATENT DOCUMENTS

| CN | 103563556 A | 2/2014 | |
|---|---|---|---|
| EP | 1321024 A1 * | 6/2003 | ........... A01D 41/127 |

(Continued)

OTHER PUBLICATIONS

EP 1321024 english translation (Year: 2003).*

*Primary Examiner* — Anne Marie Antonucci
*Assistant Examiner* — Nicholas Patrick Langhorne
(74) *Attorney, Agent, or Firm* — Michael Best & Friedrich LLP

(57) ABSTRACT

A harvester includes a separator configured to separate a cut crop into a billet material and extraneous plant matter, a billet loss sensor configured to generate a first signal indicative of the amount of billet material that is lost and unharvested at the separator; a trash sensor configured to generate a second signal indicative of the amount of the extraneous plant matter that is harvested from the separator, and a control unit configured to, based at least partly on the first signal and the second signal, determine a preferred ground speed of the harvester and/or a preferred separator speed of the harvester.

16 Claims, 4 Drawing Sheets

(56)                 References Cited

U.S. PATENT DOCUMENTS

| | | | |
|---|---|---|---|
| 5,558,282 A | 9/1996 | Ameye et al. | |
| 6,363,700 B1 | 4/2002 | Fowler | |
| 7,195,557 B2 | 3/2007 | Hettiger | |
| 9,084,393 B1 | 7/2015 | Singleton | |
| 9,456,547 B2 | 10/2016 | Cazenave et al. | |
| 10,091,934 B2 | 10/2018 | Dugas et al. | |
| 10,412,888 B2 | 9/2019 | Matway et al. | |
| 10,959,376 B2 | 3/2021 | Pereira et al. | |
| 2004/0053653 A1 | 3/2004 | Isfort et al. | |
| 2004/0224735 A1 | 11/2004 | Hinds | |
| 2005/0150202 A1* | 7/2005 | Quick | A01D 41/127 |
| | | | 460/1 |
| 2006/0271243 A1* | 11/2006 | Behnke | A01D 41/127 |
| | | | 700/284 |
| 2007/0135935 A1 | 6/2007 | Maertens et al. | |
| 2009/0017885 A1 | 1/2009 | Halls | |
| 2012/0110969 A1 | 5/2012 | Hinds | |
| 2013/0145940 A1 | 6/2013 | Roberge et al. | |
| 2014/0129048 A1* | 5/2014 | Baumgarten | G06Q 30/0283 |
| | | | 701/1 |
| 2014/0295923 A1 | 10/2014 | Vergote | |
| 2015/0327438 A1 | 11/2015 | Cazenave et al. | |
| 2017/0086372 A1 | 3/2017 | Palla et al. | |
| 2018/0116114 A1 | 5/2018 | Craig et al. | |
| 2019/0037770 A1* | 2/2019 | Dugas | A01D 45/10 |
| 2019/0261564 A1 | 8/2019 | Gunda et al. | |
| 2020/0137958 A1 | 5/2020 | Hansen et al. | |
| 2021/0112714 A1 | 4/2021 | Murray et al. | |
| 2021/0195836 A1* | 7/2021 | Koch | G06Q 50/02 |

FOREIGN PATENT DOCUMENTS

| | | |
|---|---|---|
| JP | H10215633 A | 8/1998 |
| WO | 2000032026 A1 | 6/2000 |
| WO | 2018037542 A1 | 3/2018 |
| WO | 2018037543 A1 | 3/2018 |

* cited by examiner

SPEED CONTROL FOR HARVESTER

CROSS-REFERENCE TO RELATED APPLICATIONS

This application claims priority to U.S. Provisional Patent Application No. 63/407,000, filed Sep. 15, 2022, the entire contents of which are incorporated herein by reference.

BACKGROUND

The present disclosure relates to a sugarcane harvester and more particularly to a cleaning arrangement of a sugar cane harvester that assists in separating sugarcane billets from leaves, dirt, and other trash.

A sugarcane harvester severs sugarcane plants from the ground with a base cutter assembly and transports the severed plants to a set of chopping drums that chop the severed plant into smaller billets. The billets are sent through a cleaning arrangement to separate the billets from non-billet material such as leaves, dirt, and other trash. Passing through the cleaning system, the billets are then dispatched to stowed in, for example, a trailing vehicle.

SUMMARY

The present disclosure relates to a harvester including a separator configured to separate a cut crop into a billet material and extraneous plant matter, a billet loss sensor configured to generate a first signal indicative of the amount of billet material that is lost and unharvested at the separator; a trash sensor configured to generate a second signal indicative of the amount of the extraneous plant matter that is harvested from the separator, and a control unit configured to, based at least partly on the first signal and the second signal, determine a preferred ground speed of the harvester and/or a preferred separator speed of the harvester.

The present disclosure further relates to a control system for a harvester having a separator for separating a cut crop into a billet material and extraneous plant matter, the separator including a fan. The control system is configured to monitor an amount of the billet material that is lost and unharvested at the separator, monitor an amount of the extraneous plant matter that is harvested from the separator, and calculate a financial cost of the lost billet material and the extraneous plant matter based on the monitored amounts of billet material and extraneous plant matter and further based on an external input.

The present disclosure further relates to a control system for a harvester having a separator for separating a cut crop into a billet material and extraneous plant matter. The control system is configured to monitor an amount of the billet material that is harvested, monitor an amount of the billet material that is lost and unharvested from the separator, monitor an amount of the extraneous plant matter that is harvested from the separator, and calculate a financial return of the harvested billet material in view of the lost billet material, the harvested extraneous plant matter, and further based on an external input.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of supporting other implementations and of being practiced or of being carried out in various ways.

Figure 1A:
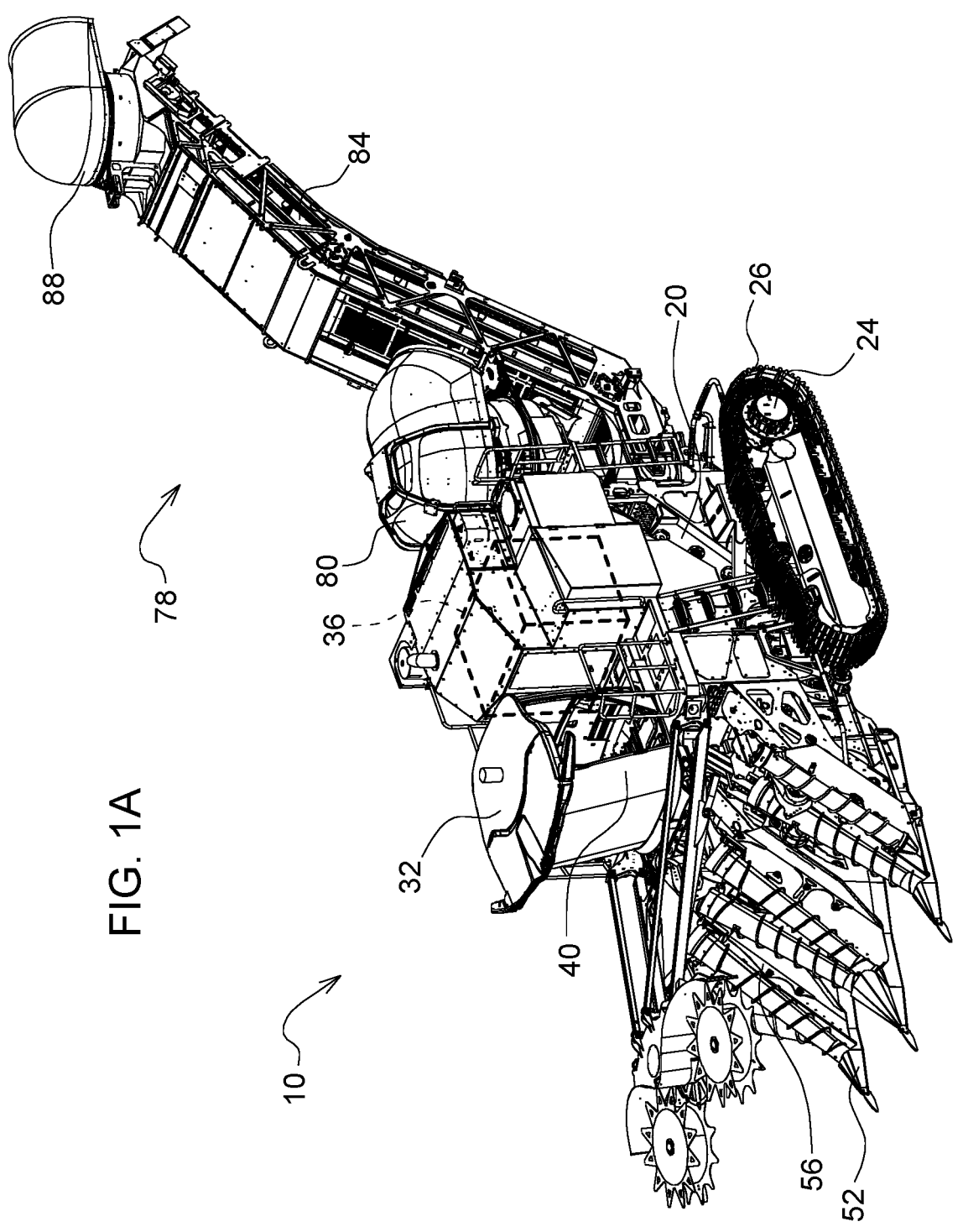
FIG. 1A is a perspective view of a sugarcane harvester.
Figure 1B:
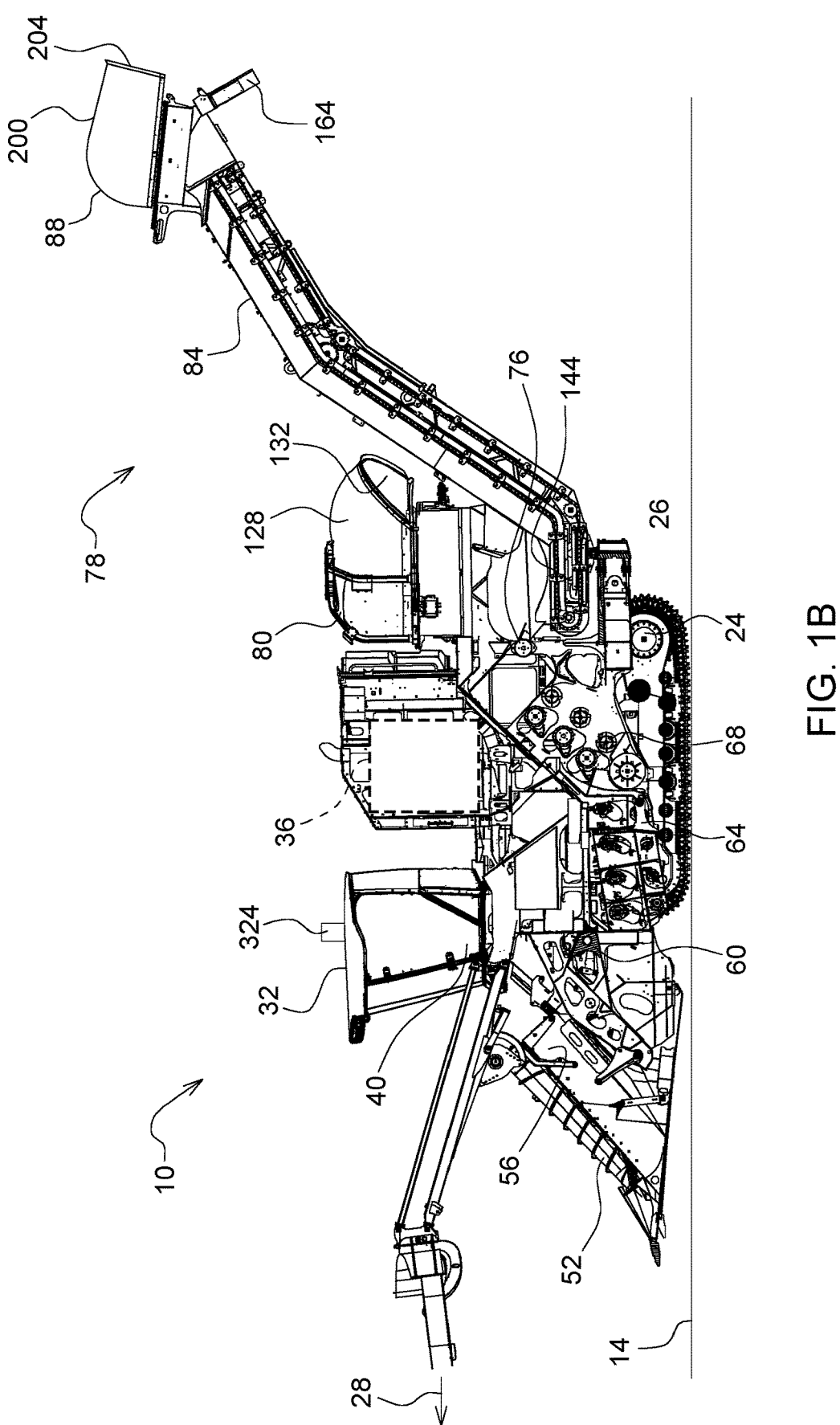
FIG. 1B is a side view of the sugarcane harvester of FIG. 1.

FIG. 1A illustrates a harvester 10, such as a sugarcane harvester, configured to harvest crop from a field 14. The illustrated harvester 10 includes a main frame 20 supported on wheels 24 that engage the field 14 in order to move the harvester 10 across the field 14 in a direction of travel 28 (FIG. 1B). In some implementations, the wheels 24 may include continuous tracks 26 or other traction devices. An operator's cab 32 is mounted on the frame 20 above a prime mover 36, such as an engine. The prime mover 36 may be an internal combustion engine or other such device for providing motive power. The harvester 10 includes a throttle 40 for controlling a speed of the prime mover 36 and thus a speed of the harvester 10 (also referred to as the harvester speed). The harvester 10 includes a pair of crop lifters 52 mounted to the front of the frame 20, defining an inlet 56 for receiving the crop.

FIG. 1B illustrates a side view of the harvester 10 with portions removed. The crop lifters 52 cooperate with a knockdown roller 60 and a base cutter 64 to remove the crop from the field 14. Feed rollers 68 are disposed within the inlet 56 to feed the crop from the field 14 into the harvester 10. The feed rollers 68 operate at a feed speed. The harvester 10 further includes a chopper 76, and a cleaning arrangement or cleaning system 78 (also referred to herein as residue discharge system) including a primary separator 80 and/or a secondary separator 88. The harvester 10 also includes a conveyor 84 (also referred to herein as an elevator) connecting the primary separator 80 and the secondary separator 88.

Figure 1C:
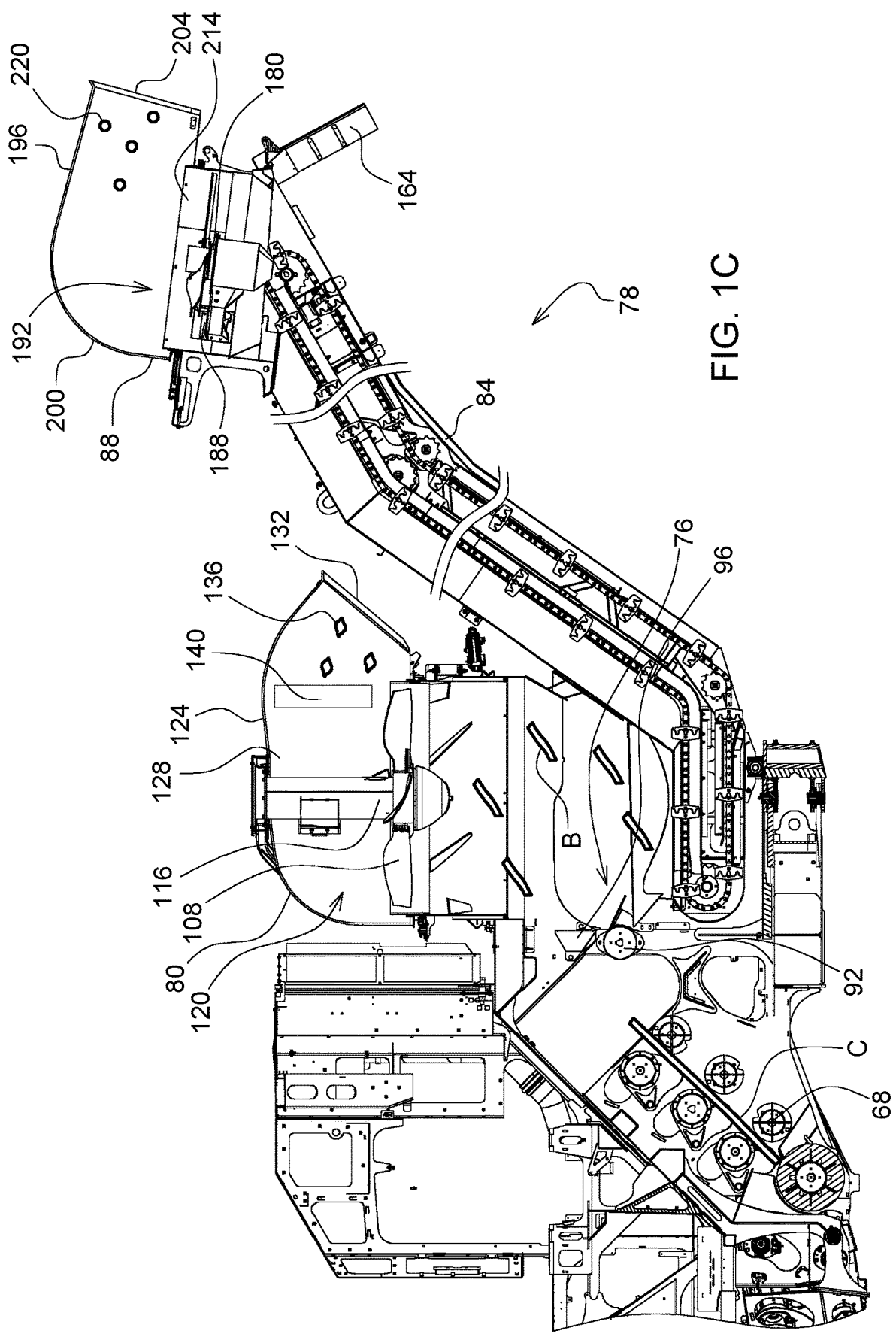
FIG. 1C is a cross-sectional side view of a portion of the sugarcane harvester of FIG. 1.

FIG. 1C illustrates the chopper 76 and the cleaning system 78 in more detail. The chopper 76 is disposed adjacent the feed rollers 68 to cut the crop. The chopper 76 may include a set of chopper drums 92 driven by a motor. The chopper drums 92 include a blade 96 for cutting the stalks of the crop. In one implementation, the chopper 76 may include counter rotating drum cutters with overlapping blades. In other implementations, the chopper 76 may include any suitable blade or blades for cutting the stalks of crop. The chopper 76 cuts the stalks of crop, referred to as cane C, into crop billet B, which includes pieces of the stalk. The crop also includes dirt, leaves, roots, and other plant matter, which is collectively referred to herein as extraneous plant matter. The chopper 76 operates at a chopper speed, which may be adjusted to change a size and weight of the resulting chopped crop pieces. The chopper 76 directs a stream of the cut crop, including crop billet B and extraneous plant matter, to the cleaning system 78 and specifically to the primary separator 80.

The cleaning system 78 is generally configured to distinguish between the billet B and the extraneous plant matter. (The extraneous plant matter may be referred to herein as residue, especially when ejected from the cleaning system 78). The cleaning system 78 is generally operable at an adjustable cleaning speed. The primary separator 80 is coupled to the frame 20 and disposed downstream of the chopper 76 for receiving cut crop from the chopper 76. The primary separator 80 generally separates the extraneous plant matter from the crop billet B by way of any suitable mechanism for cleaning the cut crop, such as a fan, a source of compressed air, a rake, a shaker, or any other mechanism that distinguishes various types of crop parts by weight, size, shape, etc. in order to separate extraneous plant matter from crop billet. In the illustrated implementation, the primary separator 80 includes a primary fan 108 driven at a separator speed (i.e., primary fan speed) by a primary motor 116. In other embodiments, if the primary separator is a source of compressed air, it is provided at a separator speed (i.e., air speed) by controlling a valve, if the primary separator is a rake, it is moved at a separator speed (i.e., rate/speed of the rake) driven by a motor, if the separator is a shaker, it is moved at a separator speed (i.e., rate/speed of the shaker) driven by a motor. The primary fan speed can be varied by controlling the primary motor 116. Thus, in the illustrated implementation, the cleaning speed may include the primary fan speed; however in other implementations, the cleaning speed may include air speed (e.g., of released compressed air or any other pressurized air), rake speed, shaker speed, etc. The primary separator 80 further includes a primary cleaning chamber 120 generally defined by a primary cleaner housing 124.

The primary separator 80 includes a primary hood 128 coupled to the main frame 20. The primary hood 128 may have a domed shape, or other suitable shape, and includes a primary opening 132 (also referred to herein as first outlet) angled out from the harvester 10 and facing slightly down towards the field 14. The hood 128 directs separated extraneous plant matter through the primary opening 132 to the outside of the harvester, back onto the field 14. In some implementations the primary separator 80 includes a primary shredder 140 that shreds the residue into smaller pieces (primary residue 136), which can be selectively activated by an operator. The separated crop, including mostly crop billet B (e.g., cane), is directed to an outlet of the cleaning chamber 120 and is deposited in a basket 144 disposed below the primary separator 80.

With continued reference to FIG. 1C, the conveyor 84 is coupled to a rear of the frame 20 for receiving the separated crop from the basket 144. The conveyor 84 extends from the rear of the harvester 10 and terminates at a discharge opening 164 (also referred to herein as a second outlet) elevated to a height suitable for discharging cleaned crop into a vehicle. The second outlet does not discharge the harvested material to the field, like the first outlet, but instead discharges the material to a collection vehicle. A secondary separator 88 is disposed adjacent the discharge opening 164 for cleaning the crop a second time before being discharged into the vehicle. The secondary separator 88 may include a fan, a compressed air source, a rake, a shaker, or other suitable device. In the illustrated implementation, the secondary separator 88 includes a secondary fan 180 driven at a separator speed (i.e., secondary fan speed) by a secondary motor 188. In other embodiments, if the secondary separator 88 is a compressed air source, rake, or shaker, the separator is operated at a separator speed in a similar manner as the compressed air source, rake, or shaker described above with respect to the primary separator 80. The secondary separator 88 includes a secondary cleaning chamber 192 defined by a secondary cleaner housing 196. The secondary cleaner housing 196 includes a secondary hood 200 having a secondary opening 204. The secondary crop cleaner is operable such that additional extraneous plant matter is discharged through the secondary opening 204 and the remaining separated crop is discharged through the discharge opening 164 and into the vehicle. In some implementations, the secondary separator 88 includes a secondary shredder 214 that shreds the residue into smaller pieces (secondary residue 220), which can be selectively activated by the operator.

Crop billet B that is lost to the field (e.g., through the hoods 128, 200 of the separators 80, 88) decreases the overall efficiency of the harvester 10 and the harvesting operation as the crop billet B that is left in the field will not be processed to extract the sugar. Further, extraneous plant matter (e.g., leaf material) that is harvested and sent to the mill has no sugar content but is still transported and processed, which has associated costs. The leaf material also acts as a sponge to absorb sugar, which is thereby lost in the process, thereby also decreasing the efficiency of the harvesting operation.

One factor that impacts the amount of cane lost to the field and the amount of extraneous plant matter that is sent to the mill is the speed of the cleaning fans 108, 180. As the speed of the fans 108, 180 increases, the higher airflow removes a larger percentage of extraneous plant matter, but also pulls up more cane billets B and discharges them into the field, thereby increasing cane loss. Fan speed settings may be adjustable by an operator of the harvester 10 to balance the amount of leaf sent to the mill and the amount of cane discharged into the field. Another factor that impacts the amount of cane lost to the field and the amount of extraneous plant matter that is sent to the mill is the ground speed of the harvester 10 while harvesting. A pour rate of material through the harvester 10 has an impact on both cleaning and losses as material enters the cleaning chamber 120. The ground speed of the harvester 10 controls the pour rate and, in some embodiments, is manually controlled by the operator or grower operation.

Control systems, such as the control system described in U.S. Pat. No. 10,091,934, the entire contents of which are hereby incorporated by reference, enable sensing of cane loss and leaf content. However, when determining fan speed and vehicle speed, such control systems do not consider external factors such as sugar absorption by leaf, transport cost for transporting the harvested material to the mill, or processing costs relating to the cost to process the harvested material at the mill.

Figure 2:
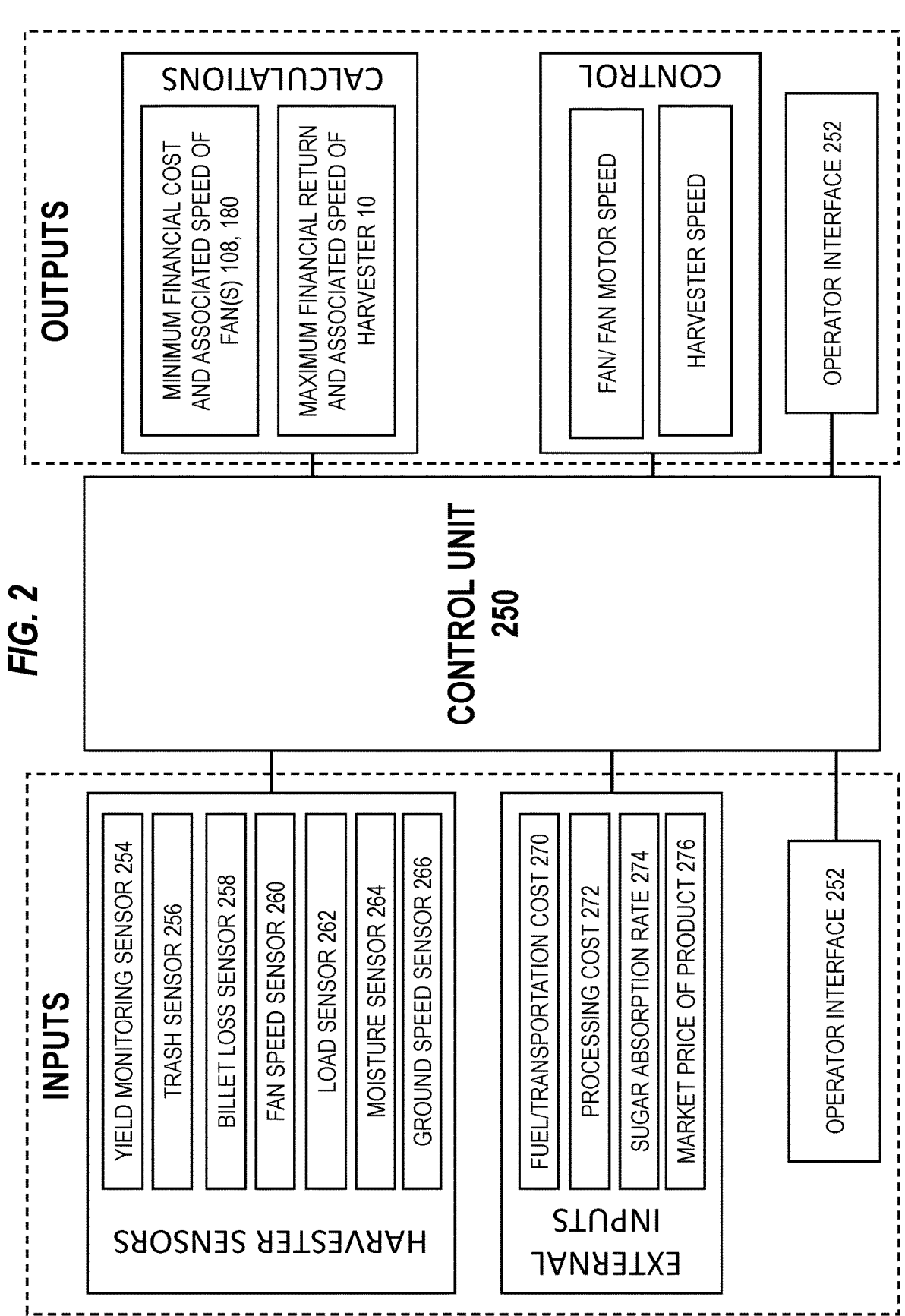
FIG. 2 is a schematic representation of a control system of the sugarcane harvester of FIG. 1.

The control system 250 illustrated schematically in FIG. 2 is incorporated into the harvester 10 for controlling aspects of the harvester 10 such as the speed of the fans 108, 180 and the ground speed of the harvester 10 to achieve a minimized financial operating cost. The control system 250 may be a microprocessor-based electronic control unit or the like, for receiving signals from an operator interface 252 (i.e., external inputs) and from several internal sensors (i.e., relating to the harvester 10 itself) and for sending signals to control various components of the harvester 10. The aforementioned sensors may include a yield monitoring sensor 254 that sends signals corresponding to an amount of crop discharged from the discharge opening 164 to a vehicle. A trash sensor 256 sends signals indicative of the amount of extraneous plant matter that is discharged from the discharge opening 164 to a vehicle. A billet loss sensor 258 sends signals corresponding to the amount of billet loss through one or both of the hoods 128, 200. A fan speed sensor 260 sends signals corresponding to the speed of one or both of the fans 108, 180. A load sensor 262 sends signals relating to the load or pressure of one or both of the separators 80, 88. A moisture sensor 264 sends signals indicative of the moisture content of the crop within one or both of the separators 80, 88. A ground speed sensor 266 sends signals corresponding to the speed of the harvester 10 along a ground surface.

The control system 250 is further configured to receive (e.g., via the operator interface 252, via a wirelessly delivered input such as a web-based input) external inputs related to external elements that extend beyond the internal operation of the harvester 10. A first external input 270 is indicative of fuel and transportation cost which may include, for example, gas prices for the harvester 10, the field vehicles that collect the harvested material, and the over-the-road vehicles that transport the harvested material to the mill. The transportation cost may further include data relating to the distance to be traveled between the field or farm and the mill. A second external input 272 is indicative of processing costs for processing the cane billets B at the mill. A third external input 274 is sugar absorption rates of the leaves of the extraneous plant matter, which may vary based on the specific variety of sugarcane being harvested by the harvester. A fourth external input 276 is the market price of sugar, either as raw unprocessed billet material B or as a processed and refined product. The external input data is location, time, and market sensitive and therefore changes based on the market conditions, harvesting location, the time of day, and the time of year.

The control system 250 is programmed to control the speed of one or both of the fans 108, 180 based on the external inputs and/or indicate a preferred fan speed to the operator (e.g., via the operator interface 252). If indicating a preferred fan seed to the operator, the operator is able to manually adjust the fan speed in view of the preferred fan speed (e.g., to match the preferred fan speed). As the amount of cane loss and the amount of harvested extraneous plant matter is regulated at least in part based on the speed of the fan(s) 108, 180, the control system 250 is programmed to control the amount of cane loss and the amount of harvested extraneous plant matter based on the external inputs. The control system 250 determines a minimum financial cost based on the external inputs by determining a first value relating to the value of the sugar that is lost during harvesting and determining a second value relating to the overall cost of the harvested extraneous plant matter (including sugar absorption, transportation costs, mill processing costs). The first and second values are added together to determine the minimum financial cost.

The harvester 10 incorporates sensor data into the calculation of the minimum financial cost. In addition to the external factors, the calculated minimum financial cost is based on the amount (e.g., volume, weight) of billet material that is lost and the amount of extraneous plant material that is harvested. These amounts are viewed in the lens of the first and second values, respectively to determine the minimum financial cost. The harvester 10 is calibrated by running one or both of the fans 108, 180 at varying fan speeds such that the control system 250 analyzes the amount (e.g., volume, weight) of billet material that is lost and the amount of extraneous plant material that is harvested at the different fan speeds. The financial cost at each speed is calculated to determine which fan speed results in the minimum financial cost.

As an illustrative example, the control system 250 receives external inputs that indicate that the value of sugar that is lost during harvest is $X/ton and the cost of harvesting extraneous plant matter is $Y/ton. The harvester 10 is calibrated by operating the fan 108 at a first speed for a set amount of time. The sensors 256, 258 provide signals to the control system 250 while the harvester is operated at the first speed indicating a first amount of billet loss (e.g., 0.2 tons) and a first amount of harvested extraneous plant matter (e.g., 0.2 tons). Operating the harvester 10 at a second fan speed greater than the first fan speed for the set amount of time, the sensors 256, 258 provide signals to the control system indicating a second amount of billet loss (e.g., 0.3 tons) and a second amount of harvested extraneous plant matter (e.g., 0.1 tons). Operating the harvester 10 at a third fan speed less than the first fan speed for the set amount of time, the sensors 256, 258 provide signals to the control system indicating a third amount of billet loss (e.g., 0.1 tons) and a third amount of harvested extraneous plant matter (e.g., 0.25 tons). The control system 250 compares the measured amounts to the determined per/weight values to determine a minimum financial cost. In the example provided, when the ratio of the values $X/$Y is less than 0.75, the minimum financial cost is achieved by operating at the second fan speed as the calculation $(0.3)X+(0.1)Y$ associated with the measurements at the second fan speed results in a lower financial cost than at the first fan speed $((0.2)X+(0.2)Y)$ or at the third fan speed $((0.1)X+(0.25Y))$. However, when the ratio of the values $X/$Y is greater than 0.75, the minimum financial cost is achieved by operating at the third fan speed as the calculation $((0.1)X+(0.25Y))$ associated with the measurements at the third fan speed results in a lower financial cost than at the first fan speed $((0.2)X+(0.2)Y)$ or at the second fan speed $((0.3)X+(0.1Y))$. The control system 250 therefore chooses a fan speed based not only on the amounts of billet loss and harvested extraneous plant matter, but also based on the financial implications of such inefficiencies.

The control system 250 is further programmed to control the vehicle ground speed (i.e., speed of the harvester 10) or indicate a preferred vehicle ground speed (e.g., by providing a visual or audio signal to the operator via the operator interface 252) to the vehicle operator for harvesting the plant material based on the external inputs. If indicating a preferred vehicle seed to the operator, the operator is able to manually adjust the vehicle speed in view of the preferred vehicle speed (e.g., to match the preferred vehicle speed). The control system 250 determines a maximum financial return based on the external inputs by determining a first value relating to the value of the cane that is harvested (i.e., delivered to the trail vehicle/wagon), a second value relating to the overall cost of the harvested extraneous plant matter, a third value relating to the value of the sugar that is lost during harvesting, and a fourth value relating to the cost of operating the harvester. The second, third, and fourth values are subtracted from the first value to determine the financial return.

The harvester 10 incorporates sensor data into the calculation of the maximum financial return. In addition to the external factors, the calculated maximum financial return is based on the amount (e.g., volume, weight) of billet material that is harvested, the amount of billet material that is lost, and the amount of extraneous plant material that is harvested. These amounts are viewed in the lens of the first, second, third, and fourth values relating to the financial return to determine the maximum financial return. The harvester 10 is calibrated by operating at varying ground speeds such that the control system 250 analyzes the amount (e.g., volume, weight) of billet material that is harvested and lost and the amount of extraneous plant material that is harvested at the different vehicle speeds. The financial return at each speed is calculated to determine which ground speed results in the maximum financial return.

The control system 250 receives external inputs that indicate that the value of sugar that is lost during harvest is $X/ton, the cost of harvesting extraneous plant matter is $Y/ton, the value of the harvested billets is $Z/ton, and the operating costs for the harvester are $A/minute or $A/mile. The harvester 10 is calibrated by operating the harvester 10 at separate speed for a set amount of time. At first, second, third, and/or more different speeds, the harvester 10 is operated and the sensors 254, 256, 258 provide signals to the control system 250 at the varied speed indicating amounts of billet harvested, amounts of billet lost, amounts of harvested extraneous plant matter, and operating losses (e.g., fuel economy). The control system 250 compares the measured values to the determined values to determine which speed generates the maximum financial return. For example, operating at a first speed may result in a greater amount of harvested materials than operating a second speed but also results in decreased fuel economy and increased billet loss and harvested extraneous plant matter than operating at a second speed. If the losses at the first speed outweigh the financial gains of harvesting additional material, the control system 250 modifies the vehicle speed (or instructs the operator to modify the vehicle speed) to operate at the second speed. However, if the losses do not outweigh the additional gains of harvesting additional billet material B, the control system 250 operates the vehicle (or instructs the operator to operate the vehicle) at the first vehicle speed.

Although some aspects have been described in detail with reference to certain preferred embodiments, variations and modifications exist within the scope and spirit of one or more independent aspects as described.

What is claimed is:

1. A harvester comprising:
a separator configured to separate a cut crop into a billet material and extraneous plant matter,
a billet loss sensor configured to generate a first signal indicative of the amount of billet material that is lost and unharvested at the separator;
a trash sensor configured to generate a second signal indicative of the amount of the extraneous plant matter that is harvested from the separator; and
a control unit configured to, based at least partly on the first signal and the second signal, determine a preferred ground speed of the harvester and/or a preferred separator speed of the separator,
wherein the control unit is configured to determine the preferred separator speed of the separator based at least partly on the first signal and the second signal, and wherein the control unit is further configured to calculate a plurality of financial costs at different speeds of the separator, determine a minimum financial cost of the plurality of financial costs, and control a speed of the separator at the preferred separator speed to correspond to the minimum financial cost,
wherein calculating the plurality of financial costs includes:
(i) selecting a set of candidate separator speeds within an operating range of the separator; and
(ii) for each candidate separator speed, computing a respective financial cost based at least partly on the first signal and the second signal; and
wherein controlling the speed of the separator includes automatically commanding the separator to the candidate separator speed corresponding to the minimum financial cost.

2. The harvester of claim 1, wherein the control unit is configured to determine the preferred ground speed of the harvester based at least partly on the first signal and the second signal, and wherein the control unit is further configured to modify a ground speed of the harvester in view of the preferred ground speed.

3. The harvester of claim 1, further comprising an operator interface, wherein the control unit is configured to determine the preferred ground speed of the harvester based at least partly on the first signal and the second signal, wherein the control unit is further configured to indicate the preferred ground speed of the harvester to an operator at the operator interface.

4. The harvester of claim 1, wherein the control unit is further configured to indicate the preferred separator speed of the separator to an operator at an operator interface.

5. The harvester of claim 1, wherein the control unit is configured to calculate a financial cost of the lost billet material and the harvested extraneous plant matter based on the first signal, the second signal, and further based on an external input.

6. The harvester of claim 5, wherein the preferred ground speed of the harvester and/or the preferred separator speed of the separator corresponds to a financial cost that is less than the calculated financial cost.

7. The harvester of claim 5, wherein the external input includes one or more of a fuel/transportation cost, a mill processing cost of the extraneous plant matter, a sugar absorption rate of the extraneous plant matter, or a market price of the billet material.

8. The harvester of claim 5, further comprising an operator interface configured to receive an input from an operator of the harvester, wherein the control unit is configured to receive the external input via the operator interface.

9. The harvester of claim 1, wherein the harvester is a sugarcane harvester, and wherein the cut crop is sugarcane.

10. The harvester of claim 1, wherein the separator includes a fan driven by a motor, wherein the control unit is configured to control a speed of the motor.

11. The harvester of claim 1, wherein the control unit is configured to calculate a financial cost of the lost billet material and the harvested extraneous plant matter based on the first signal, the second signal, and further based on a signal from a load sensor, a moisture sensor, and/or a ground speed sensor.

12. A control system for a harvester having a separator for separating a cut crop into a billet material and extraneous plant matter, the separator including a fan, the control system configured to:
monitor an amount of the billet material that is lost and unharvested at the separator;
monitor an amount of the extraneous plant matter that is harvested from the separator;
calculate a financial cost of the lost billet material and the harvested extraneous plant matter based on the monitored amounts of billet material and extraneous plant matter and further based on an external input, and
calculate a plurality of financial costs at different speeds of the fan, determine a minimum financial cost of the plurality of financial costs, and control a speed of the fan to correspond to the minimum financial cost,
wherein calculating the plurality of financial costs at different speeds of the fan includes:
(i) selecting a set of candidate fan speeds within an operating range of the fan; and
(ii) for each candidate fan speed, computing a respective financial cost based on the monitored amounts and the external input; and
wherein controlling the speed of the fan includes automatically driving the fan to the candidate fan speed corresponding to the minimum financial cost without requiring operator selection of the candidate fan speed.

13. The control system of claim 12, wherein the external input includes one or more of a fuel/transportation cost, a mill processing cost of the extraneous plant matter, a sugar absorption rate of the extraneous plant matter, or a market price of the billet material.

14. The control system of claim 12, wherein the control system is further configured to provide an instruction to an operator to modify a speed of the harvester in response to the calculated financial cost of the lost billet material and the harvested extraneous plant matter.

15. A control system for a harvester having a separator for separating a cut crop into a billet material and extraneous plant matter, the control system configured to:

monitor an amount of the billet material that is harvested;

monitor an amount of the billet material that is lost and unharvested from the separator;

monitor an amount of the extraneous plant matter that is harvested from the separator;

calculate a financial return of the harvested billet material in view of the lost billet material, the harvested extraneous plant matter, and further based on an external input; and calculate a plurality of financial returns at different speeds of the harvester, determine a maximum financial return of the plurality of financial returns, and control a speed of the harvester to correspond to the maximum financial return, wherein calculating the plurality of financial returns at different speeds of the harvester includes:

(i) selecting a set of candidate ground speeds within an operating range of the harvester; and (ii) for each candidate ground speed, computing a respective financial return based on (a) the monitored amount of billet material that is harvested, (b) the monitored amount of billet material that is lost and unharvested, (c) the monitored amount of extraneous plant matter that is harvested, and (d) the external input; and wherein controlling the speed of the harvester includes automatically commanding the harvester to the candidate ground speed corresponding to the maximum financial return.

16. The control system of claim 15, wherein the external input includes one or more of a fuel/transportation cost, a mill processing cost of the extraneous plant matter, a sugar absorption rate of the extraneous plant matter, or a market price of the billet material.

* * * * *